United States Patent
Jansen et al.

(10) Patent No.: US 8,516,564 B2
(45) Date of Patent: Aug. 20, 2013

(54) SECURE USER INTERACTION USING VIRTUALIZATION

(75) Inventors: Bernhard Jansen, Rueschlikon (CH); Matthias Schunter, Zurich (CH); Axel Tanner, Kilchberg (CH); Diego M. Zamboni, Adliswil (CH)

(73) Assignee: International Business Machines Corporation, Amonk, NY (US)

( * ) Notice: Subject to any disclaimer, the term of this patent is extended or adjusted under 35 U.S.C. 154(b) by 1138 days.

(21) Appl. No.: 12/175,503

(22) Filed: Jul. 18, 2008

(65) Prior Publication Data
US 2010/0017866 A1   Jan. 21, 2010

(51) Int. Cl.
*G06F 7/04* (2006.01)

(52) U.S. Cl.
USPC .............. 726/9; 713/164; 713/172

(58) Field of Classification Search
USPC .............. 726/9; 713/164, 172, 201
See application file for complete search history.

(56) References Cited

U.S. PATENT DOCUMENTS

| | | | | |
|---|---|---|---|---|
| 6,895,502 | B1 * | 5/2005 | Fraser ............................ | 713/168 |
| 2003/0217250 | A1 * | 11/2003 | Bennett et al. ................ | 712/224 |
| 2004/0230794 | A1 * | 11/2004 | England et al. ................ | 713/164 |
| 2005/0091530 | A1 * | 4/2005 | Avraham et al. ............... | 713/201 |
| 2005/0149726 | A1 | 7/2005 | Joshi et al. | |
| 2005/0246521 | A1 | 11/2005 | Bade et al. | |
| 2006/0004944 | A1 * | 1/2006 | Vij et al. ........................... | 711/6 |
| 2006/0225127 | A1 | 10/2006 | Roberts et al. | |
| 2006/0236127 | A1 | 10/2006 | Kurien et al. | |
| 2006/0294380 | A1 * | 12/2006 | Aissi .............................. | 713/172 |
| 2007/0106986 | A1 | 5/2007 | Worley, Jr. | |
| 2007/0180448 | A1 | 8/2007 | Low et al. | |
| 2007/0199058 | A1 * | 8/2007 | Baumgart et al. ................. | 726/9 |
| 2008/0148064 | A1 * | 6/2008 | Challener et al. ............. | 713/189 |
| 2009/0172388 | A1 * | 7/2009 | Maor ............................. | 713/150 |
| 2010/0011219 | A1 * | 1/2010 | Burton et al. .................. | 713/182 |

OTHER PUBLICATIONS

Smith(2005). Virtual Machines: Architectures, Implementations and Applications. Retrieved on May 9, 2011 from http://www.hotchips.org/archives/hc17/1_Sun/HC17.T1P2.pdf.*

* cited by examiner

*Primary Examiner* — Ashok Patel
*Assistant Examiner* — Brian Shaw
(74) *Attorney, Agent, or Firm* — Daniel P. Morris; Ryan, Mason & Lewis, LLP

(57) ABSTRACT

A first virtualization layer is inserted between (i) an operating system of a computer system, and (ii) at least first and second hardware devices of the computer system. Data is communicated between the first hardware device and the second hardware device, via the first virtualization layer, without exposing the data to the operating system.

21 Claims, 4 Drawing Sheets

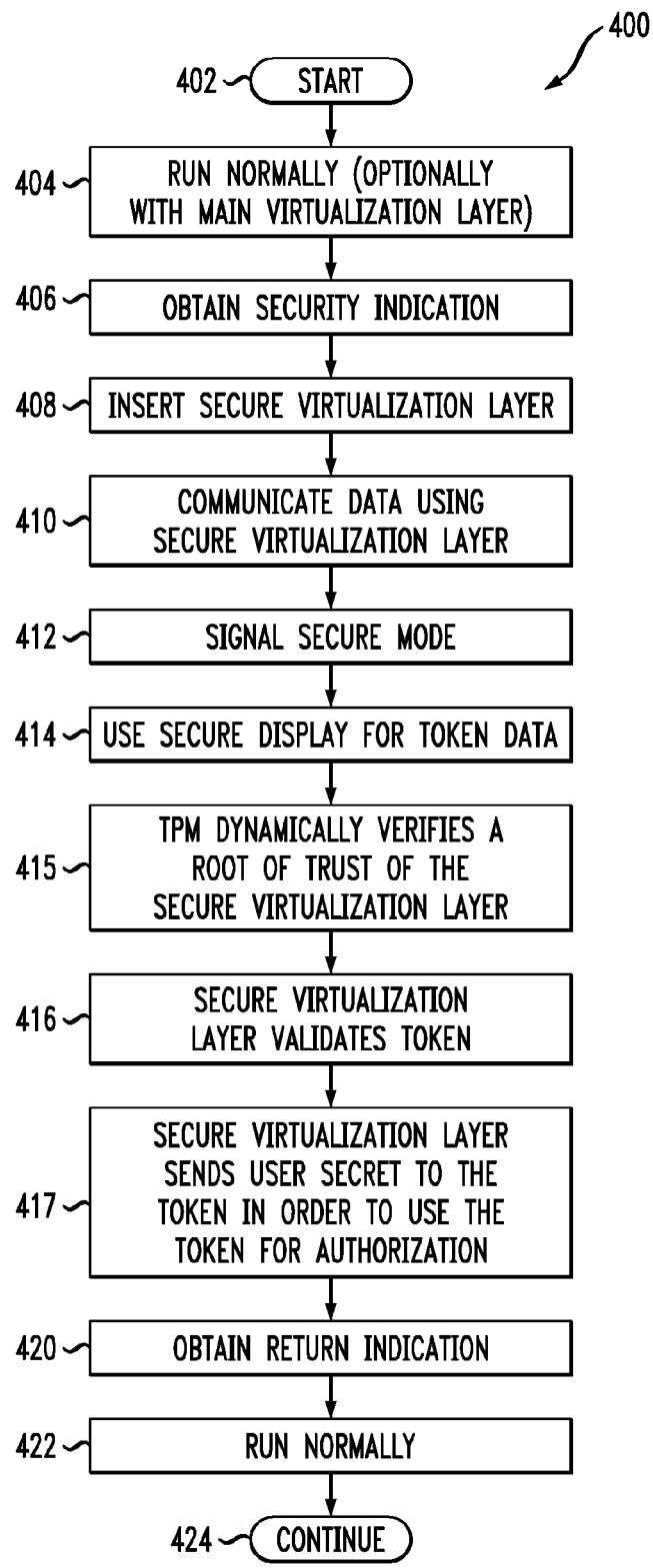

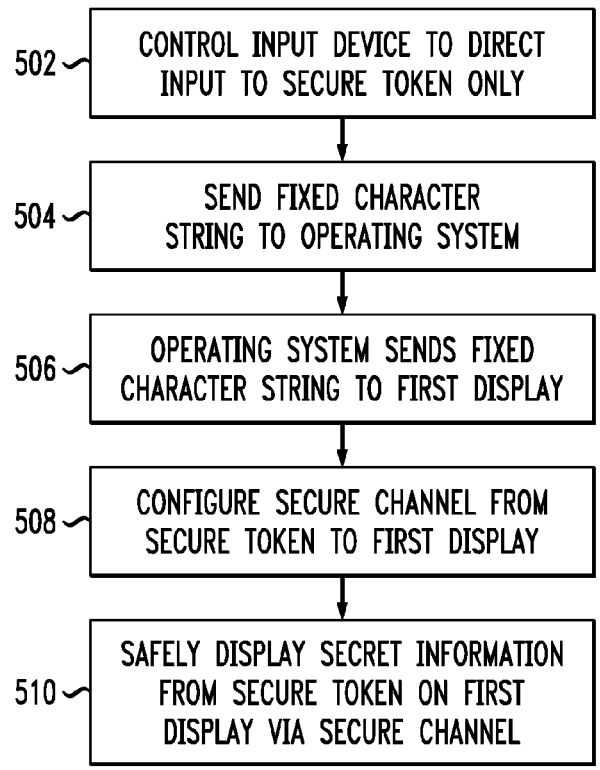
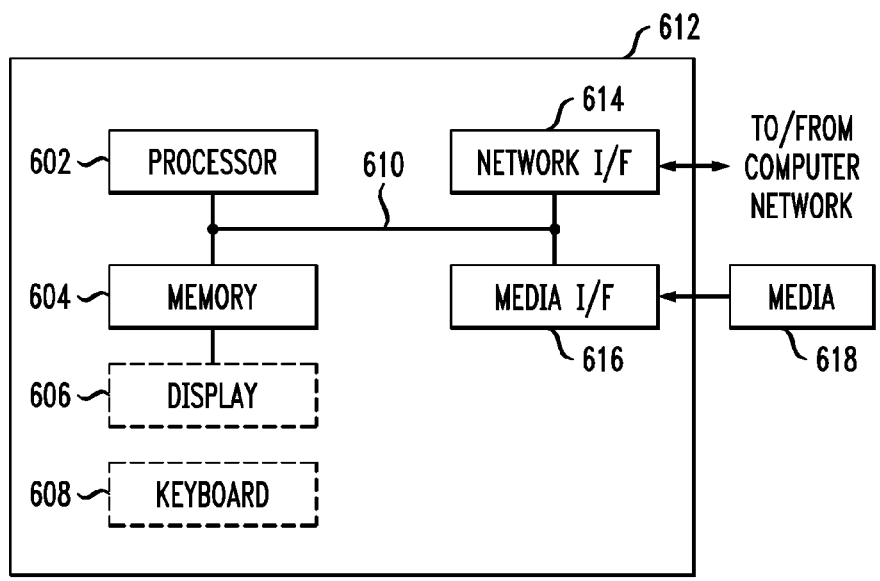

SECURE USER INTERACTION USING VIRTUALIZATION

FIELD OF THE INVENTION

The present invention relates to the electrical, electronic and computer arts, and, more particularly, to computer security and the like.

BACKGROUND OF THE INVENTION

In today's computing environment, the ability to securely authenticate users is quite significant (consider, for example, an Internet-based banking solution). The proof of identity generally lies in the presentation of a "secret" (such as a password) to the computer. Using these secrets in a secure manner relies, implicitly, on trust in the hardware/software combination which receives the secrets for the purpose of authentication.

However, current techniques may be vulnerable to problems introduced by operating systems (OS) which have been compromised by viruses or so-called "Trojan horses," which can intercept all communication from the user to the machine. One example of this is "keyloggers" which are able to intercept passwords and credit card numbers and forward them to a malicious party.

Current approaches to prevent this copying include use of cryptographic tokens, such as smartcards, or built-in security hardware, such as the trusted platform module (TPM). However, these tokens usually do not have a display and/or keyboard. As a consequence, the running operating system has to relay the tokens during input to, and output from, the security device. The operating system, in general, cannot be trusted (for example, due the presence of malicious software) and will be able to interact with the token and use the token to authenticate or sign arbitrary messages without a user being able to notice.

One remedy that has been employed is to use more complex secure tokens, such as the RSA SecurID® device (registered mark of RSA Security, Inc., Bedford, Mass., USA). This device has a display and keyboard and can perform challenge-response protocols inside the trusted device. As a consequence, the data passed through the OS (challenge/response) is no longer security-critical.

SUMMARY OF THE INVENTION

Principles of the present invention provide techniques for secure user interaction using virtualization. In one aspect, an exemplary method (which can be computer implemented) includes the steps of: inserting a first virtualization layer between (i) an operating system of a computer system, and (ii) at least first and second hardware devices of the computer system; and communicating data between the first hardware device and the second hardware device, via the first virtualization layer, without exposing the data to the operating system. It should be noted that in one or more embodiments, the virtualization layer is not inserted between the operating system and just specific hardware elements (such as input/output and/or secure token devices), but rather under the whole operating system, mediating its access to the entire set of hardware One or more embodiments of the invention or elements thereof can be implemented in the form of a computer product including a computer usable medium with computer usable program code for performing the method steps indicated. Furthermore, one or more embodiments of the invention or elements thereof can be implemented in the form of an apparatus including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include hardware module(s), software module(s), or a combination of hardware and software modules.

One or more embodiments of the invention may offer one or more of the following technical benefits. One benefit is that the OS cannot get to the data, as all data transfers between devices are controlled exclusively via the virtualization layer, that is, a compromised operating system cannot capture and misuse the information flowing through the secure channel between the devices. Another advantage is the elimination of the need to trust the complex operating system; instead, it is only necessary to trust the much less complex virtualization layer code.

These and other features, aspects and advantages of the present invention will become apparent from the following detailed description of illustrative embodiments thereof, which is to be read in connection with the accompanying drawings.

BRIEF DESCRIPTION OF THE DRAWINGS

FIG. 4 shows a flow chart of an exemplary method, according to another aspect of the invention;

FIG. 5 shows exemplary steps that can be used to implement a portion of the method of FIG. 4; and FIG. 6 depicts a computer system that may be useful in implementing one or more aspects and/or elements of the present invention.

DETAILED DESCRIPTION OF PREFERRED EMBODIMENTS

One or more embodiments of the invention create a trusted path between the user and a secure token, or more generally between two devices in the computer, without additional hardware needs, by using virtualization. Virtualization can be introduced statically or dynamically on-the-fly (for example, using HyperJacking as discussed below) by introducing a virtualization layer between the visible operating system and the hardware. In one or more embodiments, although a full virtualization layer could be employed, no full virtualization layer is needed; rather a lightweight, special-purpose virtualization layer can enable a trusted path between two devices in the computer.

The virtualization layer, according to one or more embodiments of the invention, is a layer of software between the operating system and the hardware, performing one or more inventive activities as described herein. In some instances, the virtualization layer may be a specific piece of software written for a specific purpose. In other instances, the functionality of the virtualization layer is added to a traditional "hypervisor" (a layer between the operating system and the hardware that allows multiple operating systems to run on the hardware (HW) the same time). In some cases, the virtualization layer can be installed on the fly. In the prior art, so-called "HyperJacking" techniques have been used to insert a software layer in a running system, for purposes of intrusion detection, without the need to reboot. Such techniques can be modified by the skilled artisan, given the teachings herein, to permit on-the-fly installation of the virtualization layer 220 (discussed below); other techniques for installing the virtualization layer may also be employed.

By way of a non-limiting example, techniques to enable secure password entry through the normal keyboard to a secure token, and secure user output to a display, will be described. Thus, the creation of a secure path between devices in a computer system is described in an exemplary embodiment of secure password entry between a keyboard and a secure token, and between the secure token and a display. Note, however, that one or more techniques of the invention are generally applicable for secure pathways between other local devices.

Figure 1:
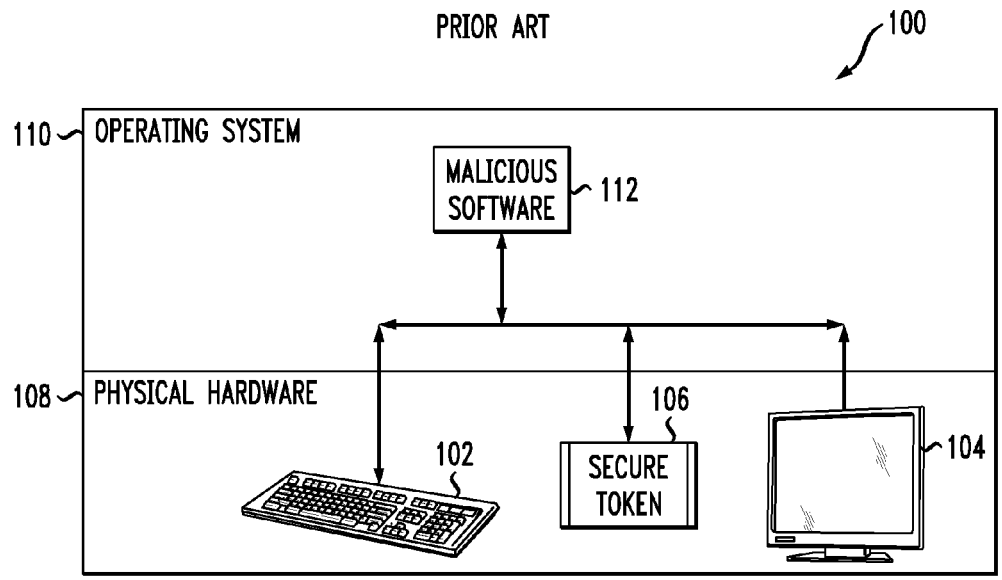
FIG. 1 shows a prior art system.

Attention should now be given to FIG. 1, which depicts a prior art system 100. Physical hardware devices 108 (which may include devices such as keyboard 102, monitor 104, and secure token 106) communicate through operating system 110. However, system 110 may be infected with malicious software 112. Thus, in FIG. 1, all information from and to the physical devices 108 (keyboard 102, secure token 106 and display 104) flows through the running operating system 110, and is therefore accessible to any malicious code 112 running in this operating system.

Figure 2:
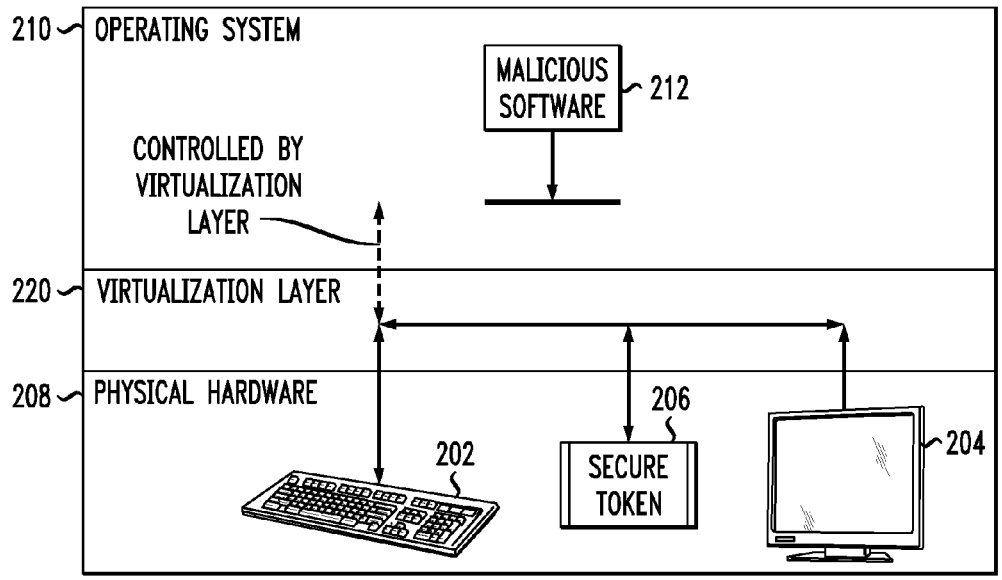
FIG. 2 shows an exemplary system, according to an aspect of the invention.

In FIG. 2, a virtualization layer 220 is introduced, which has exclusive control about the physical hardware, that is, virtualization layer 220 can decide what parts of the communication between the devices 208 is exposed to the operating system 210. Note that elements in FIG. 2 similar to those in FIG. 1 have received the same reference character incremented by one hundred. In the exemplary embodiment 200 of FIG. 2, communication between devices 208 can be made inaccessible for malicious code 212 in the operating system 210.

It should be noted though that although a full virtualization layer is depicted in FIG. 2, one or more embodiments of the invention can employ a "lightweight" special-purpose virtualization layer, much smaller than a full virtualization layer. One non-limiting example of a full virtualization layer, which could be used with one or more embodiments of the invention, is the Xen® hypervisor (registered mark of XenSource, LLC, Palo Alto, Calif., USA). As multiple layers of virtualization layers are becoming feasible now, in one or more instances, the aforementioned lightweight virtualization layer could be introduce on-the-fly as needed even if the system 200 were already virtualized by a different (full) virtualization layer. As used herein, on-the-fly introduction of a virtualization layer refers to introduction at run time, without the need to reboot the system.

Figure 3:
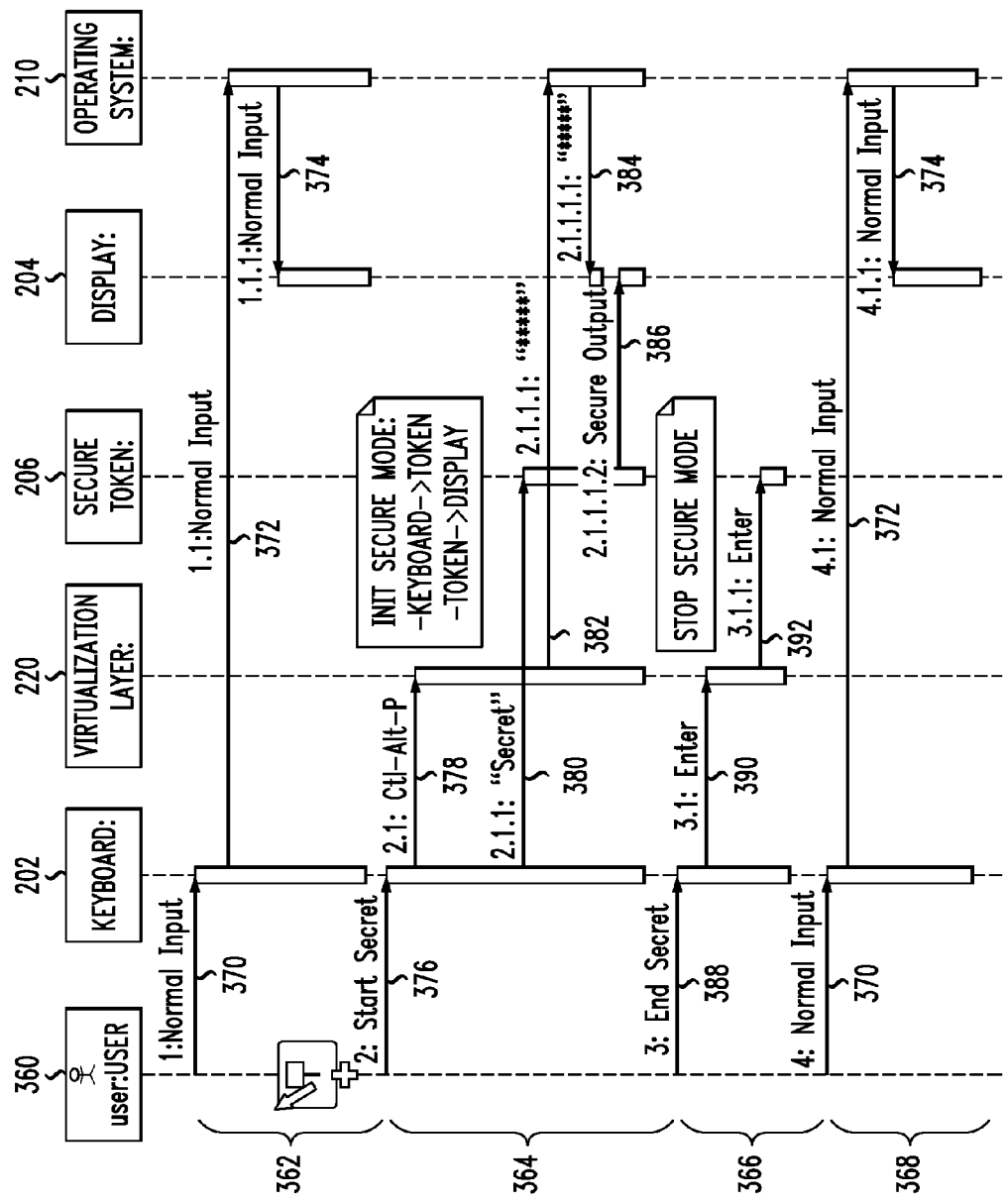
FIG. 3 shows an exemplary timeline depicting operation of the system of FIG. 2, in one particular non-limiting instance.

FIG. 3 presents a timeline for a non-limiting specific exemplary application of system 200. In particular, FIG. 3 depicts interactions between a user 360 in front of a computing device which has keyboard 202, secure token 206, and display device 204. On the hardware, a virtualization layer 220 is running, which in turn has started an operating system 210.

As shown at 362, during normal operation, input 370 from the user 360 to keyboard 202 will be delivered unchanged through the virtualization layer 220 to the operating system 210, as at 372, which in turn shows it on the display 204, as at 374. As shown at 364, the user 360 starts a secure connection by typing, as at 376, a predefined key combination (such as, for example, Ctrl-Alt-P) which the virtualization layer 220 listens for, as at 378. The virtualization layer switches the configuration of the devices in a way that input from keyboard 202 is now directed to the secure token 206 only, as at 380.

The virtualization layer 220 also sends some fixed character(s), for example, "******" from the virtualization layer to the operating system 210, as at 382, instead of the original keyboard input. Such fixed character(s) are also sent from the operating system for presentation on the display 204, as at 384. In addition, a secure channel 386 is configured by the virtualization layer 220 from the secure token 206 to the display 204. This allows showing, in a secure manner, secret information (for example, a challenge string or even the password) from the secure token 206 on the display 204.

As shown at 366, the secure mode is ended by the virtualization layer 220 after receiving the ending character (for example 'enter') from the keyboard. Entry of 'enter' on the keyboard is shown at 388 and the transmission form keyboard 202 to virtualization layer 220 is shown at 390. Virtualization layer 220 communicates the "enter" to token 206 at 392. Device connections are reconfigured to the normal mode. As shown at 368, normal input described at 362 above again takes place, in a non-secured mode.

The basic mechanism just described can be extended in one or more of the following ways: signaling the secure mode, alternative displays, attestation of the virtualization layer, and/or a secure back end embedded in the virtualization layer. In the case of signaling the secure mode, the virtualization layer 220 can signal to the user 360 that the machine is in secure mode by, for example, switching on keyboard light emitting diodes (LEDs) in a specific pattern. In the case of alternative displays, alternative devices could be used for displaying information from the secure token 206 (that is, devices other than display 204); for example, a built-in display on a keyboard, or a secondary computer display.

The aforementioned attestation of the virtualization layer will now be discussed. In one or more instances of this scenario, the virtualization layer is a security critical component. Although it is much less complex, and therefore much easier to control, than a whole operating system, as an additional security measure an attestation step can be added: the secure token 206 can do an attestation step to dynamically verify the root of trust of the running virtualization layer code. Through this attestation process, the virtualization layer can also be used to keep and reveal a user secret. By way of provision of further detail, in one or more embodiments, TPM sealing is used to guarantee that a user secret in the TPM chip can only be retrieved if the measurements of the virtualization platform are correct.

The aforementioned secure backend embedded in the virtualization layer will now be discussed. By providing a backend for an RSA-like token inside the virtualization layer, this code can validate that it talked to a secure token; it can unseal the password and enter it into the security token. That is, the virtualization layer, once it has obtained a user secret, can validate a token. Once the token has successfully been validated, the virtualization layer sends the user secret to this token in order to use the token for authorization.

In view of the foregoing discussion, attention should now be given to FIG. 4, which shows a flow chart 400 of steps in an exemplary method, according to an aspect of the invention. After beginning at 402, optional step 404 includes running the computer system (for example, system 200) in a normal mode. The "main virtualization layer" mentioned in step 404 will be discussed further below. Optional step 406 includes obtaining a security indication from the user that the user desires to enter a secure mode. Step 408 includes inserting a first virtualization layer, such as layer 220, between (i) an operating system 210 of a computer system, and (ii) at least first and second hardware devices (for example any of the devices in the physical hardware 208 of the computer system, including but not limited to keyboard 202, secure token 206, and display 204). Step 410 includes communicating data between the first hardware device and the second hardware device, via the first virtualization layer, without exposing the data to the operating system.

In some instances, the first hardware device is an input/output device for interfacing with a user and the second hardware device is a secure token 206. Furthermore, in some instances, the input/output device includes an input device, such as keyboard 202, and a first display, such as display 204. In optional step 412, the first virtualization layer signals to the user that the computer system is in a secure mode. In optional step 414, an additional (second) display, different than the first display, is available, and this step includes limiting display of information from the secure token to the second display.

In one or more embodiments, the security token is a TPM. Optional step 415 includes the TPM dynamically verifying a root of trust of the first virtualization layer.

Optional step 416 includes the first virtualization layer validating the token. Optional step 417 includes, subsequent to the validating, the first virtualization layer sending the user secret to the token in order to use the token for authorization. Note that while step 417 should be performed after step 416, in general, the steps in FIG. 4 and the other flow charts can be performed in any logical order.

Optional step 420 includes obtaining a return indication from the user that the user desires to return to the normal mode. Optional step 422 includes, responsive to the return indication, again running the system in the normal mode. Processing continues in step 424. As noted elsewhere, in some instances, computer system 200 has a second virtualization layer running between the operating system and the at least first and second hardware devices. The second virtualization layer may be a "main" virtualization layer, such as the aforementioned Xen® hypervisor, as indicated in the parentheses in step 404. Furthermore, in some instances, the insertion of the first virtualization layer is accomplished in an on-the-fly manner, optionally, even while the second virtualization layer is already running. On-the-fly insertion can be done when using only a single (security) hypervisor, and furthermore, it can also be done when a "heavy duty" hypervisor like Xen is already running.

Note that the steps in FIG. 4 need not necessarily be performed in the indicated order; for example, step 408 need not necessarily be done in response to step 406—the secure virtualization layer may already be installed and the security indication may just instruct it to shield data from the operating system.

FIG. 5 shows a non-limiting exemplary manner in which step 410 can be performed. Recall that in some instances, the input/output device includes an input device 102 and a first display 204; further, that in some instances, the communicating step 410 is responsive to the security indication of step 406. As shown in FIG. 5, in some cases, communicating step 410 includes the first virtualization layer controlling the input device, such that input from the input device is directed to the secure token only, as at step 502. Further, the first virtualization layer sends a fixed character string to the operating system instead of the input from the input device, at step 504; and the operating system sends the fixed character string for presentation on the first display, as at step 506. In step 508, the first virtualization layer configures a secure channel from the secure token to the first display, and in step 510, the secret information from the secure token is safely displayed on the first display via the secure channel.

Note that, in one or more embodiments, the "security token" referred to herein could be a TPM (Trusted Platform Module) chip which is embedded in most newer computers, and which can be used to aid in security-related operations such as authentication and attestation. Such a device is simply a chip inside the computer, without any display or user-input capabilities, and embodiments of the invention make it possible to communicate with it securely.

Exemplary System and Article of Manufacture Details

A variety of techniques, utilizing dedicated hardware, general purpose processors, firmware, software, or a combination of the foregoing may be employed to implement the present invention or components thereof. One or more embodiments of the invention, or elements thereof, can be implemented in the form of a computer product including a computer usable medium with computer usable program code for performing the method steps indicated. Furthermore, one or more embodiments of the invention, or elements thereof, can be implemented in the form of an apparatus including a memory and at least one processor that is coupled to the memory and operative to perform exemplary method steps.

One or more embodiments can make use of software running on a general purpose computer or workstation. With reference to FIG. 6, such an implementation might employ, for example, a processor 602, a memory 604, and an input/output interface formed, for example, by a display 606 and a keyboard 608. The term "processor" as used herein is intended to include any processing device, such as, for example, one that includes a CPU (central processing unit) and/or other forms of processing circuitry. Further, the term "processor" may refer to more than one individual processor. In connection with FIG. 6, the term "memory" is intended to include memory associated with a processor or CPU, such as, for example, RAM (random access memory), ROM (read only memory), a fixed memory device (for example, hard drive), a removable memory device (for example, diskette), a flash memory and the like (note the distinction between memory and storage in connection with the other figures). In addition, the phrase "input/output interface" as used herein, is intended to include, for example, one or more mechanisms for inputting data to the processing unit (for example, mouse), and one or more mechanisms for providing results associated with the processing unit (for example, printer). The processor 602, memory 604, and input/output interface such as display 606 and keyboard 608 can be interconnected, for example, via bus 610 as part of a data processing unit 612. Suitable interconnections, for example via bus 610, can also be provided to a network interface 614, such as a network card, which can be provided to interface with a computer network, and to a media interface 616, such as a diskette or CD-ROM drive, which can be provided to interface with media 618.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and executed by a CPU. Such software could include, but is not limited to, firmware, resident software, microcode, and the like.

Furthermore, the invention can take the form of a computer program product accessible from a computer-usable or computer-readable medium (for example, media 618) providing program code for use by or in connection with a computer or any instruction execution system. For the purposes of this description, a computer usable or computer readable medium can be any apparatus for use by or in connection with the instruction execution system, apparatus, or device. The medium can store program code to execute one or more method steps set forth herein.

The medium can be an electronic, magnetic, optical, electromagnetic, infrared, or semiconductor system (or apparatus or device) or a propagation medium. Examples of a computer-readable medium include a semiconductor or solid-state memory (for example memory 604), magnetic tape, a removable computer diskette (for example media 618), a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor 602 coupled directly or indirectly to memory elements 604 through a system bus 610. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards 608, displays 606, pointing devices, and the like) can be coupled to the system either directly (such as via bus 610) or through intervening I/O controllers (omitted for clarity).

Network adapters such as network interface 614 may also be coupled to the system to enable the data processing system to become coupled to other data processing systems or remote printers or storage devices through intervening private or public networks. Modems, cable modem and Ethernet cards are just a few of the currently available types of network adapters.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code (virtualization layer(s)) will typically execute on the computer to be protected.

Embodiments of the invention have been described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. For example, some systems may offer hardware support for virtualization.

In any case, it should be understood that the components illustrated herein may be implemented in various forms of hardware, software, or combinations thereof, for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method comprising the steps of:

inserting a first virtualization layer between (i) an operating system of a computer system, and (ii) at least first and second hardware devices of said computer system; and communicating data between said first hardware device and said second hardware device, through said first virtualization layer, without exposing said data to said operating system;

wherein said first virtualization layer is operative to interact with said operating system; and wherein said first hardware device comprises an input/output device for interfacing with a user and said second hardware device comprises a secure token;

further comprising the additional steps of:

said first virtualization layer validating said token; and subsequent to said validating, said first virtualization layer sending a user secret to said token in order to use said token for authorization.

2. The method of claim 1, further comprising the additional step of said first virtualization layer signaling to said user that said computer system is in a secure mode.

3. The method of claim 1, wherein said input/output device comprises an input device and a first display, further comprising the additional step of limiting display of information from said secure token to a second display that is different than said first display.

4. The method of claim 1, wherein said security token comprises a trusted platform module, further comprising the additional step of said trusted platform module dynamically verifying a root of trust of said first virtualization layer.

5. The method of claim 1, wherein said computer system has a second virtualization layer running between said operating system and said at least first and second hardware devices, said second virtualization layer being a main virtualization layer, and wherein said insertion of said first virtualization layer is accomplished in an on-the-fly manner while said second virtualization layer is already running.

6. A method comprising the steps of:
    inserting a first virtualization layer between (i) an operating system of a computer system, and (ii) at least first and second hardware devices of said computer system; and
    communicating data between said first hardware device and said second hardware device, through said first virtualization layer, without exposing said data to said operating system;
    wherein said first virtualization layer is operative to interact with said operating system; and
    wherein said first hardware device comprises an input/output device for interfacing with a user and said second hardware device comprises a secure token;
    wherein said input/output device comprises an input device and a first display, further comprising the additional steps of:
    running said computer system in a normal mode; and
    obtaining a security indication from said user that said user desires to enter a secure mode;
    wherein said communicating step is responsive to said security indication and wherein said communicating step comprises:
        said first virtualization layer controlling said input device such that input from said input device is directed to said secure token only;
        said first virtualization layer sending a fixed character string to said operating system instead of said input from said input device;
        said operating system sending said fixed character string for presentation on said first display;
        said first virtualization layer configuring a secure channel from said secure token to said first display; and
        safely displaying secret information from said secure token on said first display via said secure channel.

7. The method of claim 6, further comprising the additional steps of:
    obtaining a return indication from said user that said user desires to return to said normal mode; and
    responsive to said return indication, again running said system in said normal mode.

8. A computer program product comprising a non-transitory computer-readable storage medium having computer usable program code embodied therewith, said computer program product including:
    computer usable program code for inserting a first virtualization layer between (i) an operating system of a computer system, and (ii) at least first and second hardware devices of said computer system; and
    computer usable program code for communicating data between said first hardware device and said second hardware device, through said first virtualization layer, without exposing said data to said operating system;
    wherein said first virtualization layer is operative to interact with said operating system; and
    wherein said first hardware device comprises an input/output device for interfacing with a user and said second hardware device comprises a secure token;
    further comprising:
    computer usable program code for said first virtualization layer validating said token; and
    computer usable program code for, subsequent to said validating, said first virtualization layer sending a user secret to said token in order to use said token for authorization.

9. The computer program product of claim 8, further comprising computer usable program code for said first virtualization layer signaling to said user that said computer system is in a secure mode.

10. The computer program product of claim 8, wherein said input/output device comprises an input device and a first display, further comprising computer usable program code for limiting display of information from said secure token to a second display that is different than said first display.

11. The computer program product of claim 8, wherein said security token comprises a trusted platform module, further comprising computer usable program code for said trusted platform module dynamically verifying a root of trust of said first virtualization layer.

12. The computer program product of claim 8, wherein said computer system has a second virtualization layer running between said operating system and said at least first and second hardware devices, said second virtualization layer being a main virtualization layer, and wherein said computer usable program code for inserting said first virtualization layer comprises computer usable program code for accomplishing said insertion in an on-the-fly manner while said second virtualization layer is already running.

13. A computer program product comprising a non-transitory computer-readable storage medium having computer usable program code embodied therewith, said computer program product including:
    computer usable program code for inserting a first virtualization layer between (i) an operating system of a computer system, and (ii) at least first and second hardware devices of said computer system; and
    computer usable program code for communicating data between said first hardware device and said second hardware device, through said first virtualization layer, without exposing said data to said operating system;
    wherein said first virtualization layer is operative to interact with said operating system; and
    wherein said first hardware device comprises an input/output device for interfacing with a user and said second hardware device comprises a secure token;
    wherein said input/output device comprises an input device and a first display, further comprising:
    computer usable program code for running said computer system in a normal mode; and
    computer usable program code for obtaining a security indication from said user that said user desires to enter a secure mode;

wherein said computer usable program code for communicating is responsive to said security indication and wherein said computer usable program code for communicating comprises:
- computer usable program code for said first virtualization layer controlling said input device such that input from said input device is directed to said secure token only;
- computer usable program code for said first virtualization layer sending a fixed character string to said operating system instead of said input from said input device;
- computer usable program code for said operating system sending said fixed character string for presentation on said first display;
- computer usable program code for said first virtualization layer configuring a secure channel from said secure token to said first display; and
- computer usable program code for safely displaying said secret information from said secure token on said first display via said secure channel.

14. The computer program product of claim 13, further comprising:
- computer usable program code for obtaining a return indication from said user that said user desires to return to said normal mode; and
- computer usable program code for, responsive to said return indication, again running said system in said normal mode.

15. A system comprising:
a memory; and
at least one processor, coupled to said memory, and operative to
- insert a first virtualization layer between (i) an operating system of a computer system, and (ii) at least first and second hardware devices of said computer system; and
- communicate data between said first hardware device and said second hardware device, through said first virtualization layer, without exposing said data to said operating system;
- wherein said first virtualization layer is operative to interact with said operating system;
- wherein said first hardware device comprises an input/output device for interfacing with a user and said second hardware device comprises a secure token; and
- wherein said processor is further operative to:
  - enable said first virtualization layer to validate said token; and
  - subsequent to said validating, enable said first virtualization layer to send a user secret to said token in order to use said token for authorization.

16. The system of claim 15, wherein said processor is further operative to enable said first virtualization layer to signal to said user that said computer system is in a secure mode.

17. The system of claim 15, wherein said input/output device comprises an input device and a first display, wherein said processor is further operative to limit display of information from said secure token to a second display that is different than said first display.

18. The system of claim 15, wherein said security token comprises a trusted platform module, wherein said processor is further operative to enable said trusted platform module to dynamically verify a root of trust of said first virtualization layer.

19. An apparatus comprising:
- means for inserting a first virtualization layer between (i) an operating system of a computer system, and (ii) at least first and second hardware devices of said computer system; and
- means for communicating data between said first hardware device and said second hardware device, through said first virtualization layer, without exposing said data to said operating system;
- wherein said first virtualization layer is operative to interact with said operating system; and
- wherein said first hardware device comprises an input/output device for interfacing with a user and said second hardware device comprises a secure token;
further comprising:
- means for enabling said first virtualization layer to validate said token; and
- mean for subsequent to said validating, enabling said first virtualization layer to send a user secret to said token in order to use said token for authorization.

20. A system comprising:
a memory; and
at least one processor, coupled to said memory, and operative to:
- insert a first virtualization layer between (i) an operating system of a computer system, and (ii) at least first and second hardware devices of said computer system; and
- communicate data between said first hardware device and said second hardware device, through said first virtualization layer, without exposing said data to said operating system;
- wherein said first virtualization layer is operative to interact with said operating system;
- wherein said first hardware device comprises an input/output device for interfacing with a user and said second hardware device comprises a secure token;
- wherein said input/output device comprises an input device and a first display;
- wherein said at least one processor is further operative to:
  - run said computer system in a normal mode; and
  - obtain a security indication from said user that said user desires to enter a secure mode; and
- wherein communicating data is responsive to said security indication and wherein communicating data comprises:
  - said first virtualization layer controlling said input device such that input from said input device is directed to said secure token only;
  - said first virtualization layer sending a fixed character string to said operating system instead of said input from said input device;
  - said operating system sending said fixed character string for presentation on said first display;
  - said first virtualization layer configuring a secure channel from said secure token to said first display; and
  - safely displaying secret information from said secure token on said first display via said secure channel.

21. An apparatus comprising:
- means for inserting a first virtualization layer between (i) an operating system of a computer system, and (ii) at least first and second hardware devices of said computer system; and means for communicating data between said first hardware device and said second hardware device, through said first virtualization layer, without exposing said data to said operating system;
wherein said first virtualization layer is operative to interact with said operating system; and
wherein said first hardware device comprises an input/output device for interfacing with a user and said second hardware device comprises a secure token;
wherein said input/output device comprises an input device and a first display;
wherein said apparatus further comprises:
means for running said computer system in a normal mode; and
means for obtaining a security indication from said user that said user desires to enter a secure mode; and
wherein said communicating means is responsive to said security indication and wherein communicating data comprises:
    said first virtualization layer controlling said input device such that input from said input device is directed to said secure token only;
    said first virtualization layer sending a fixed character string to said operating system instead of said input from said input device;
    said operating system sending said fixed character string for presentation on said first display;
    said first virtualization layer configuring a secure channel from said secure token to said first display; and
    safely displaying secret information from said secure token on said first display via said secure channel.

\* \* \* \* \*